United States Patent [19]

Hippeläinen

[11] Patent Number: 5,053,784

[45] Date of Patent: Oct. 1, 1991

[54] APPARATUS AND METHOD FOR MEASURING THE AZIMUTH AND ELEVATION OF AN OBJECT

[75] Inventor: Lassi Hippeläinen, Helsinki, Finland

[73] Assignee: Vaisala Oy, Helsinki, Finland

[21] Appl. No.: 536,015

[22] Filed: Jun. 7, 1990

[30] Foreign Application Priority Data

Jun. 14, 1989 [FI] Finland ................................. 892928

[51] Int. Cl.⁵ ............................................. G01S 3/26
[52] U.S. Cl. ................................... 342/434; 342/437; 342/443; 342/445; 342/449
[58] Field of Search ............... 342/434, 423, 428, 430, 342/437, 443, 445, 446, 449

[56] References Cited

U.S. PATENT DOCUMENTS

| | | | |
|---|---|---|---|
| 2,422,107 | 6/1947 | Luck | 342/434 |
| 2,922,154 | 1/1960 | Granquist | 342/56 |
| 2,960,692 | 11/1960 | Granquist | 342/56 |
| 4,194,207 | 3/1980 | Zaüscher | 342/434 |
| 4,626,861 | 12/1986 | Wiley | 342/458 |

Primary Examiner—John B. Sotomayor

[57] ABSTRACT

The present invention concerns an apparatus and method for measuring the azimuth and elevation of an object. The apparatus includes a platform; a base plate arranged to the construction of the platform rotatably in a plane, which is essentially horizontal; a sensor frame attached to the base plate; at least three sensor elements attached to the sensor frame; and an electronics unit for the control of the sensor elements, capable of performing the processing of signals received by the sensors. The sensor frame is rigidly attached to the base plate and the directional pattern of the sensor elements is such as to cover the entire angle span of interest in the elevation plane, while the pattern covers an essentially narrower angle in the azimuth plane. The direction finder does not easily lose the tracked object performing movements particularly in the elevation plane.

6 Claims, 7 Drawing Sheets

APPARATUS AND METHOD FOR MEASURING THE AZIMUTH AND ELEVATION OF AN OBJECT

BACKGROUND OF THE INVENTION

The present invention relates to an apparatus for measuring the azimuth and elevation of an object.

The invention also concerns a method for measuring the azimuth and elevation of an object.

The invention is applied to high-resolution measurement of bearing angles (azimuth and elevation) over a large solid angle (typically over a hemisphere) corresponding to an object emitting, reflecting or relaying a marker signal. The method makes it possible to perform continuous tracking of the object.

Direction finders, that is, devices indicating an exact bearing of a selected object have been developed. Bearing angles indicated by a two-coordinate direction finder are generally designated by the azimuth (bearing angle across the horizon) and the elevation (bearing angle above or below the horizon). The location of the "horizon" of the two-coordinate direction finder is a matter of convention, permitting it to be different from the horizontal plane. In contrast to directionally selective receivers which receive a minimally corrupted signal, the characteristic feature of the direction finder is its capability to indicate an exact bearing of the real object. A directionally selective receiver can utilize signals reflected from the environment, too, while these signals represent false signals to the directional finder.

Direction finders are generally designed for the identification of either electromagnetic or mechanical vibrations. Of these two applications, those associated with electromagnetic emissions are more conventional.

An implementation frequently used in radio engineering is an antenna with high directional gain, capable of being rotated in two dimensions and used for the location of an object. Directional gain is typically achieved by means of a parabolic reflector.

For the purpose of measuring the bearing of the object and tracking of a mobile object, the surroundings of the object are scanned both in the azimuth and elevation planes. If the incoming signal is found to be stronger in any direction, the sensor is pointed to that direction. The scanning is performed by deflecting the main beam either electrically or mechanically. Tracking methods are described in several textbooks, for instance, in Antenna Engineering Handbook by Richard C. Johnson and Henry Jasik, McGraw-Hill Co., New York (2nd Edition 1984), Chapter 40-4.

A rotatable scanning sensor necessitates precision mechanical engineering. Because the entire elevation control machinery is moved along with the change of azimuth, the entire mechanical construction becomes heavy, thus necessitating the use of high-power motors and sturdy support constructions.

The pointing accuracy of the tracking sensor is linearly proportional to the aperture of the sensor and inversely proportional to the wavelength of the signal used. Therefore, the implementation of a high-precision sensor results in a high wind load and consequentially heavier mechanical constructions. The pointing accuracy is so decisive for the implementation of the rest of the system that this characteristic must be determined first during the design stage of the system.

Both azimuth and elevation tracking is implemented by means of an identical oscillating-scan method of the main beam, which in practice invariably results in interference between the signals of the different bearings. Interference by itself results from, e.g., timing errors, movements of the object during measurement or, alternatively (particularly in radio engineering), changes in the polarization plane of the transmitter resulting in a misinterpretation of the associated voltage differentials by the tracking algorithm.

The nature of the tracking algorithm dictates that the object is never coincident with the maximum gain axis of the scanning beam. The oscillating scan of the beam causes an amplitude modulation of the received signal at the oscillating-scan frequency.

A sensor with a high gain is incapable of tracking sudden movements of the object, since the pencil beam of the antenna is narrow and the mechanical system steering it is heavy. Due to the nonideal behavior of the tracking algorithm, a large steering movement in one dimension can result in a unintended change in the other tracking angle, thereby causing the loss of the target from the beam.

Loss of target becomes a major problem if the sensor is mounted on a mobile platform. The apparent movements of the object are actually the inherent movements of the sensor not yet compensated by the steering mechanism of the sensor.

The direction finder can be implemented with no moving parts as an interferometer, that is, using a sensor array from which the signal of each sensor element is processed separately. The bearing to the object is determined by comparing the transit time differentials of the signals received by the sensors against the physical spacings of the sensors. Interferometers are treated in several comprehensive textbooks, e.g., S. Haykin (Ed.): Array Signal Processing, Prentice-Hall Inc., Englewood Cliffs, N.J. (1985).

Because the signals from each of the sensors are processed individually, the sensors must have a sufficiently wide aperture to cover the entire solid angle of interest. A typical sensor in radio engineering is a ground-plane antenna, which covers almost a hemisphere.

Due to the small directional gain of the sensors, the interferometer has a short range detection capability. This is because directional sensors are unfit if a single set of sensors is used for tracking over a wide solid angle. Neither can the gain be improved by increasing the number of the sensors because time differentials cannot be measured from sensors having excessive noise which make it impossible to utilize coherent summing of the sensor signals.

If directional sensors are used for increasing the tracking range, they must be pointed to different parts of the solid angle of interest in order to cover the entire solid angle. The width of the sensor beam is inversely proportional to its gain, thus necessitating the addition of the sensors in linear proportion to the desired gain.

Generally, the beam patterns of the sensor elements are elevation-dependent. A ground-plane antenna provides no gain at low elevation angles and at the zenith.

A sensor array has always a direction in which its projected area is small. In order to avoid mutual shadowing, the sensors are typically arranged in a single plane which is parallel with the platform. If the target approaches in the same plane, the sensor array looses its direction-finding capability, because the projected area (effective aperture) in that direction is virtually zero.

Due to the nondirectional character of sensors in an interferometer, they provide no discrimination against surrounding interference even if the interference originates from a direction totally different from that of the target.

Aircraft and low-frequency ground station technology also utilizes a method, which is based on a plurality of sensors with different beam patterns. The mutual magnitude ratios of the received signals can be used for solving the bearing (Johnson and Jasik, Chapter 40-3).

Amplitude comparison is used principally because the sensor fields in this method can be constructed extremely compact. The sensor apertures are narrow and the directional accuracy of the sensors is low.

A successful amplitude comparison requires a high signal-to-noise ratio. The beam patterns of the sensors must be selected according to the direction finding method, instead of directional gain, thus making it impossible to attain sensor gain or directional discrimination of interference in this method.

OBJECTS AND SUMMARY OF THE PRESENT INVENTION

One object of the present invention is to overcome the disadvantages of prior-art methods described above and to achieve a novel type of apparatus and a method for measuring the azimuth and elevation of an object.

The present invention is based on implementing the direction finder using an interferometer which is mechanically rotatable only in the azimuth plane. Measurement of elevation is implemented using only the interferometric principle, while azimuth is obtained from a combination of interferometric and mechanical tracking data.

More specifically, the apparatus in accordance with the present invention is characterized by the sensor frame being rigidly attached to the base plate and the directional pattern of the sensor elements being such as to cover the entire angle span of interest in the elevation plane, while the pattern covers an essentially narrower angle in the azimuth plane.

Furthermore, the method in accordance with the present invention is characterized by the exact value of azimuth angle being determined by means of phase difference measurement, at least two sensor types of definitely different beam patterns being used in the elevation coordinate measurement, the ratio of the field strength signals from the different types being measured and processed to determine a coarse value of the elevation angle, and the phase difference of the sensor signals being measured in the vertical plane and computationally processed to determine the elevation with a higher resolution.

In comparison to a movable directional sensor, the direction finder in accordance with the present invention requires no movement in the elevation plane, thus disposing of a heavy drive motor. Consequently, the mechanical construction of the azimuth coordinate pointing section can be lightweighted to an appreciable extent. The sensor array can do without a large reflector, making the wind load small.

The azimuth pointing in the system according to the present invention need not be accurately aimed at the object because an exact deviation of the azimuth bearing can be measured. By adding the deviation to the actual azimuth of the sensor, the desired accurate bearing is obtained. Therefore, the mechanical construction need not have a high precision.

The direction l accuracy of the system is dependent on its aperture. cause the aperture is not related to the reflector, but instead, to the mutual placement of the sensor elements, the selection of the aperture can be postponed even up to the installation stage.

The azimuth and elevation have independent controls, thereby avoiding any interaction. This is because the elevation control is omitted from the mechanical construction while being simulated with the help of numerical methods.

The direction finder in accordance with the present invention does not easily lose the tracked object because the sensors have a wide-angle character in the elevation plane. Loss of the tracked object can occur only in the azimuth plane, in which the relocation of the object is easy, since the search takes place in the plane of a single parameter only. Even an automatic search routine for the object is possible.

When operating from a mobile platform, the only source of problems can arise from sudden movements in the azimuth plane. Aboard a ship, however, the rolling caused by waves is mainly effective in the elevation plane only.

The present invention offers significant benefits in comparison to an interferometer comprised of stationary, identical sensors. The sensors of the system in accordance with the present invention are directional and, therefore, provide gain. A system covering an entire hemisphere can be implemented using sensors covering only half of the entire elevation plane, which already gives a gain of about 3 dB. The greatest gain benefit can be obtained from the azimuth plane, in which a beam with almost minimal width can be used.

The directional pattern of the sensors can be tailored to have a gain maximum both at the horizon and at the zenith. With the means of radio engineering this goal is easily achieved using, for instance, a properly inclined corner reflector antenna.

A low actual elevation angle is not low for the system in accordance with the present invention. The horizon scanned by the sensor array can be tilted because the rear side of the sensor array permits the installation of support structures. Therefore, the elevation angle scanned in a hemisphere need not fall below 45°.

The sensors of the system are physically directional, so they can attenuate external interference originating from an azimuth angle different from that of the object.

In contrast to a method based on amplitude comparison, the aperture of the system in accordance with the present invention is large, which makes its resolution essentially better over that achievable by amplitude comparison. The noise amplitude will no more be decisive for the pointing accuracy, so the apparatus in accordance with the invention provides a vastly improved noise tolerance. Interference will be attenuated by the improved directivity of the sensors.

BRIEF DESCRIPTION OF THE DRAWINGS

The invention is next examined in detail with the help of exemplifying embodiments illustrated in the attached drawings.

FIG. 2b shows in a front view the sensors illustrated in FIG. 2a.

FIG. 6b shows in a side view the antenna array illustrated in FIG. 6a.

DETAILED DESCRIPTION OF THE PRESENT INVENTION

Figure 1:
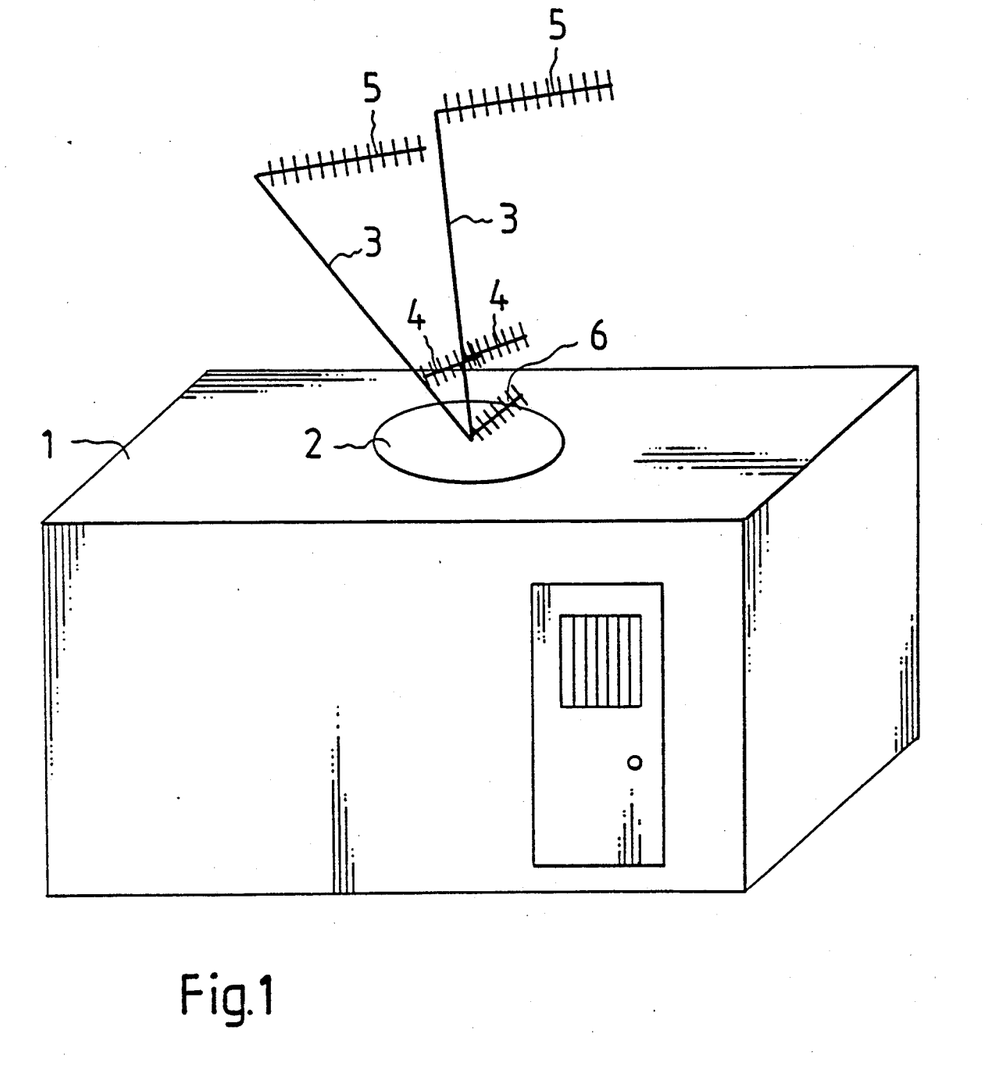
FIG. 1 shows an embodiment of a direction finder apparatus in accordance with the present invention in a perspective view.

As illustrated in FIG. 1, the direction finder in accordance with the present invention comprises a platform which in the prototype system has been a transport container. The platform 1 can also be a construction set up on the bed of a van or truck or possibly a maritime vessel. The antenna structure is mounted on a rotatable plate 2 rotating essentially horizontally. The antenna structure has a V-shaped frame 3. The frame 3 is rigidly mounted at its lower end to the rotational center of the plate 2. The frame 3 is further inclined backward by approx. 45°. Long upper antennas 5 are mounted to the tips of the V-poles, to the top part of the frame 3. The jointing point of the V-poles carries one short lower antenna 6, while a complementing set of lower antennas 4 is mounted on both V-poles. The upper antennas 5 provide a higher directivity than the lower antennas 4 and 6, and they are aligned to point closer to the horizon than the lower antennas 4. All antennas are located on the top of the frame 3.

Measurements of bearing of a meteorological sonde can be carried out using three antennas. The direction finding is possible only if the directional pattern of each antenna covers the solid angle to be examined. Since the antennas of an interferometer are stationary, the only remaining alternative in this case is a ground-plane antenna.

As soon as the antenna array is constructed rotatable, it can be designed to have directivity. Directivity is most useful for the reduction of interference effects. In addition, the capture cross-section of a ground-plane antenna at the 1680 MHz band used in the prototype tests is too low, because the gain requirement is in excess of 10 dB.

If the required three antenna elements are arranged in an L-shaped array for the measurement of horizontal and vertical phase differences, a problem arises from the asymmetrical structure. The array can be complemented with a fourth antenna (in an inverted T-form), which makes the construction symmetrical with a cost penalty, however. A V-shaped array manages without extra elements, yet providing a symmetrical construction. In addition, the antennas measuring in the vertical plane in this construction are aligned in different polarization planes, thus causing less mutual coupling than in an L-form. The V-shaped construction can also be inverted.

Figure 2A:
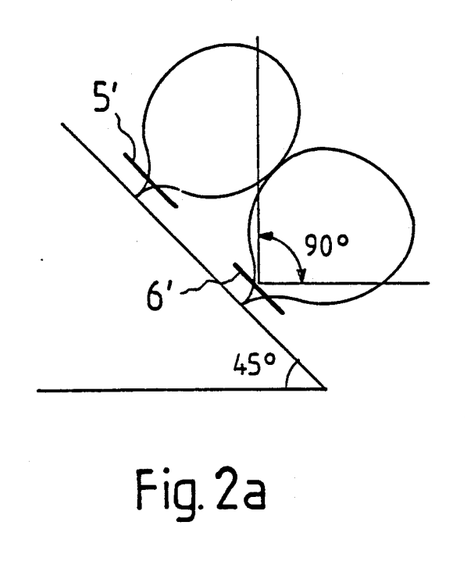
FIG. 2a shows the sensors of a second embodiment of the direction finder apparatus in a side view.
Figure 2B:
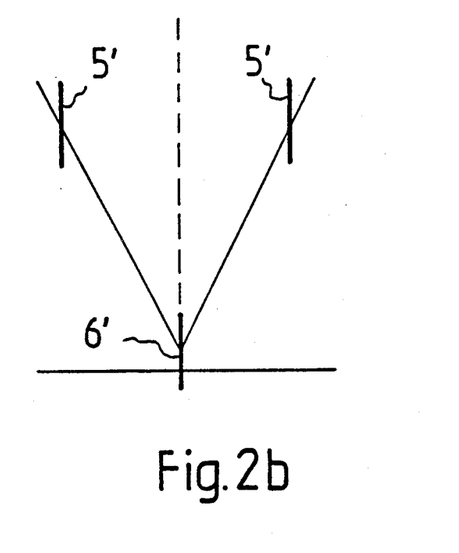

Pointing in accordance with the invention takes place so that the azimuth plane is scanned only mechanically, while the elevation plane scanning takes place from the measurements of the mutual phase differences of the antenna elements. For this purpose, the mounting plane of the antenna elements is inclined by, for instance, 45° as illustrated in FIG. 2a, thus making it possible to scan the desired elevation angle range entirely. The spacing of the elements can be in accordance with FIG. 2a greater than half wavelength, because the phase ambiguity of elevation is solved by computational means.

The antenna element must be able to receive the signal over an angle of ±30° about the beam center line. When in zenith the sonde is so close that the gain requirements are minimal, and while the sonde is in the horizon, other problems arise than those associated with the detection range. The directional gain should be over 10 dB. The front/rear gain ratio is not critical, because the antennas are inclined so that the rear side is pointed to the ground.

These requirements can be implemented using, for instance, a Yagi antenna with 5 . . . 7 pcs. of bar elements. Furthermore, the antenna can be matched to the 50 ohm standard impedance.

The directional pattern of the sensor must provide a wide beam in the electrically scanned plane (elevation) so that the beam covers the entire angle span of interest. The beam can be narrow in the mechanically scanned plane (azimuth) in which only the precision of mechanics and angular rate of object are the limiting factors.

Figure 11:
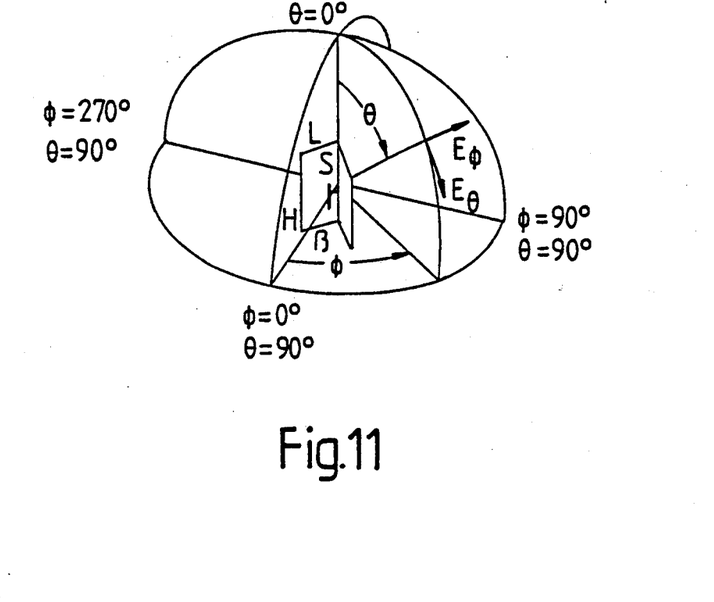
FIG. 11 shows in a perspective view a conventional corner reflector antenna and its coordinate system, which is applicable to the implementation of the present invention.
Figure 12:
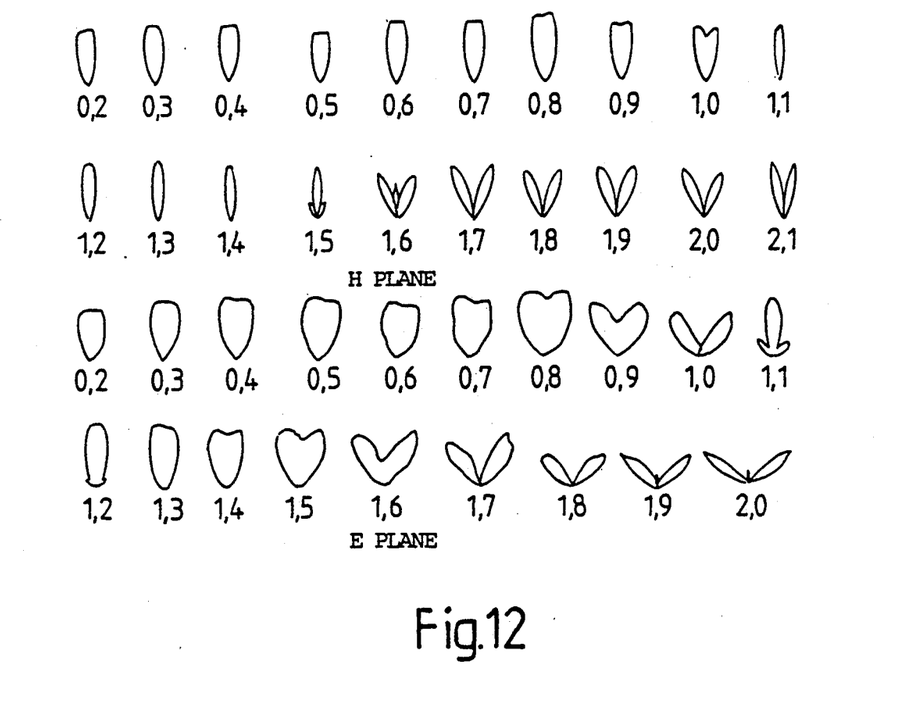
FIG. 12 shows in tabular form the directional patterns of the antenna illustrated in FIG. 11.

A preferred method for the implementation of the beam pattern in radio antennas is a corner reflector, whose structure with the associated coordinate system is illustrated in FIG. 11 which, together with FIG. 12, is reproduced from the reference book Johnson-Jasik: Antenna Engineering Handbook. Such an antenna has a smooth main lobe and only minor side lobes. In the beam patterns illustrated in FIG. 12, a useful character is provided in particular by the 60° corner reflector having the antenna element at 0.8-wavelength distance from the corner angle, whereby the directional pattern has a maximum at both low angles of elevation (sonde at far distance) and high angles of elevation (sonde at close distance). This consideration takes into account the fact that the antenna elements are inclined at an angle of 45°. For a vertically polarized incoming signal the electric field (E-field) is parallel with the elevation plane and the magnetic field (H-field) parallel with the azimuth plane.

The accuracy in elevation measurements is dependent on the signal-to-noise ratio (SNR) and the effective length of the antenna array base. If the SNR is 20 dB (that is 1/100), the mutual phase difference between the antenna elements can be solved to a resolution of $360°/100*\sqrt{2}=5.1°$. When using a wavelength-long base, the angle resolution in tracking is $5.1°/360°=0.014$ rad, or 0.81°.

When a minimum resolution of 0.1° is desired for the angle of elevation, the base must have a length of 8.1 wavelength minimum, or 1.45 m in the exemplifying case. When the antennas are tilted to an inclination of 45° and placed to the corners of a triangle, the sides of the triangle for 15° angle of elevation must be at least 1.45 m*(4/3)=1.93 m.

Improvement in SNR is possible by computational means performed on a set of measurements from which a mean is calculated. For a 30 dB SNR the tracking resolution is 0.01° when using V-poles of 2 m length.

In practice the two-meter spacing of the antenna elements is impractical, because the ambiguity of elevation becomes impossible to solve. By contrast, the placement of several antennas in accordance with FIG. 1 is possible so that there are mounted three Yagi antennas with a wider beam pattern at the lower tip of the antenna triangle, while the ends of the V-poles carry to Yagi antennas having a narrower beam pattern.

Figure 3A:
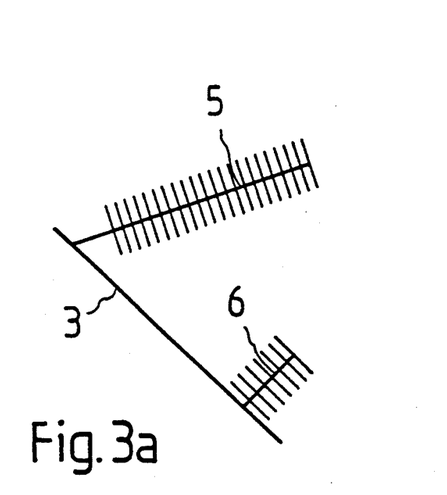
FIG. 3a shows the sensors of a third embodiment of the direction finder apparatus in a side view.
Figure 3B:
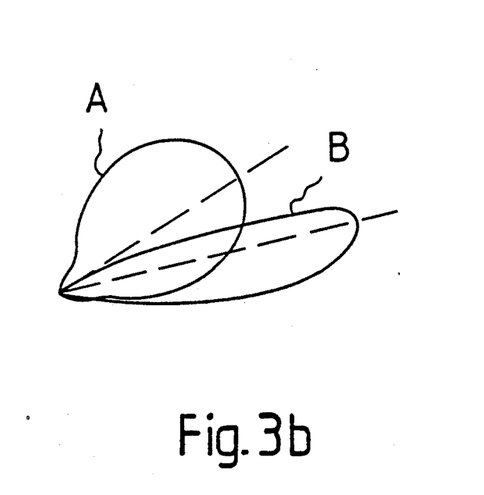
FIG. 3b shows in a side view the directional patterns of the sensors illustrated in FIG. 3a and their pointing.

The use of Yagi antennas with a narrow beam pattern brings a few additional benefits. First, the beam pattern of these antennas is different from that of wide-beam antennas so that the ratio of the amplitudes of signals received by the different elements can be used for the coarse determination of elevation. The beam B of the upper Yagi antennas 5 is pointed by, for instance, 30° above the horizon in accordance with FIGS. 3a and 3b, thereby making the amplitude ratios unambiguous. The beam B of the lower Yagi antennas 6 points higher, at about 45° angle, above the horizon. The lower Yagi antennas 4, 6 are mounted perpendicular to the antenna array frame 3.

The second attained benefit is gain improvement. The narrow-beam Yagi antennas can be designed for a main lobe of approx. ±20° beam width, which requires a structure of 15 elements minimum. Then, the antenna gain approaches 20 dB. Since the length of the antenna remains shorter than 1 m even when using a structure of 22 elements, the only limiting factor to the directivity feasible with the addition of elements is the bandwidth required. A third benefit is the attenuation of ground reflections.

The bearing of the sonde is determined with the help of the apparatus illustrated in FIG. 1 through the following sequence:

Azimuth:

the antenna is rotated through a full circle and the field strength is monitored from a reference antenna which can be assigned to be, for instance, antenna 6, the antenna array is pointed to the direction of highest field strength in order to determine a coarse azimuth angle, the antenna array is adjusted until the near-reception antennas 4 receive signals of identical phase, the above sequence is repeated for the far-reception antennas 5.

Elevation:

the ratio of field strengths at the near-reception 4 and far-reception antennas 5 is measured, a coarse estimate of elevation angle is obtained from a look-up table, the phase difference in the elevation plane is measured from the near-reception antennas 4, 6, and the corresponding angle of elevation is computed, the above sequence is repeated for the far-reception antennas 5.

Figure 4:
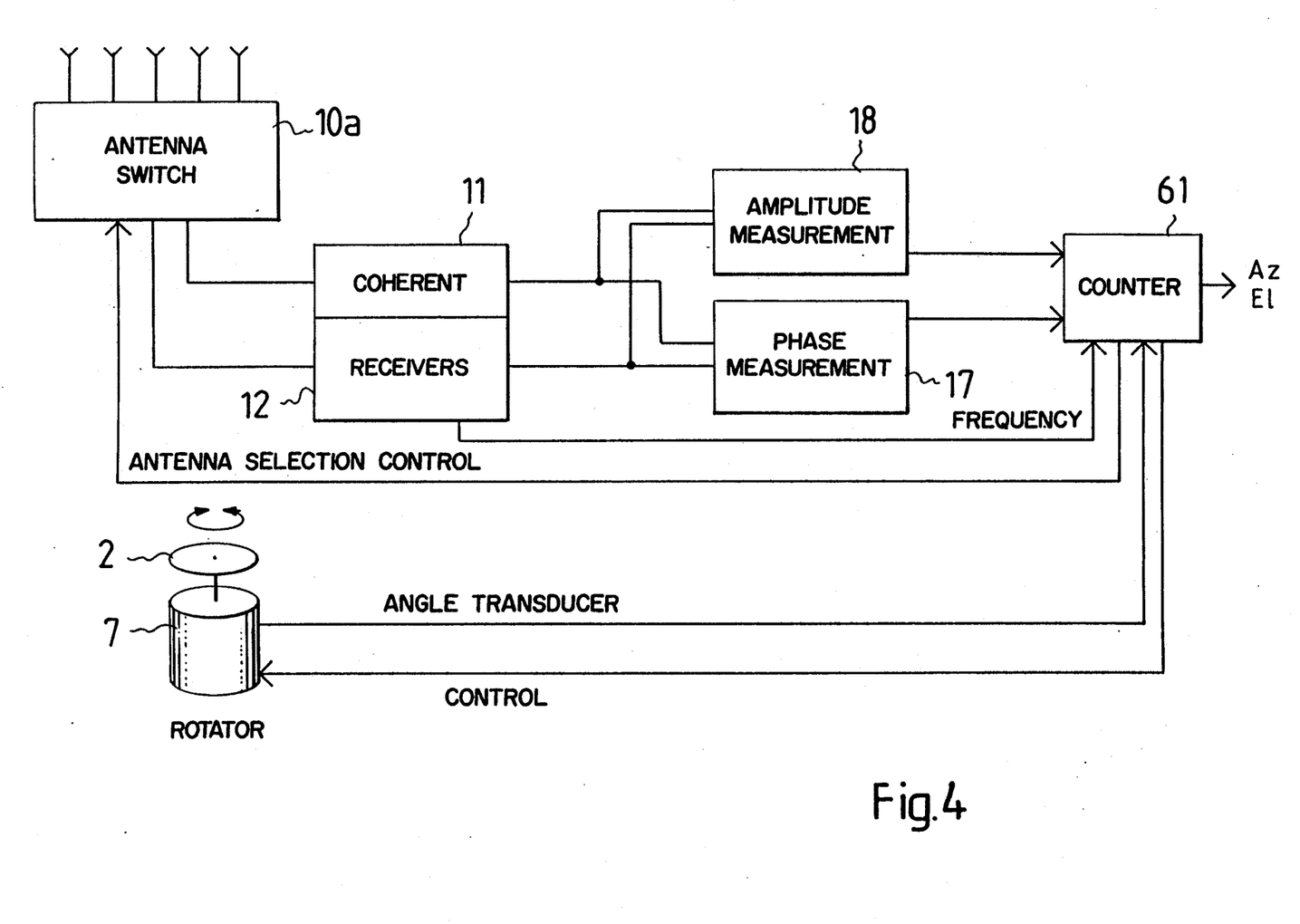
FIG. 4 shows a direction finder in accordance with the present invention in a block diagram.

A block diagram of the process implementing the above operations is illustrated in FIG. 4. The block diagram will be explained in detail along with the discussion of FIG. 10.

Figure 5:
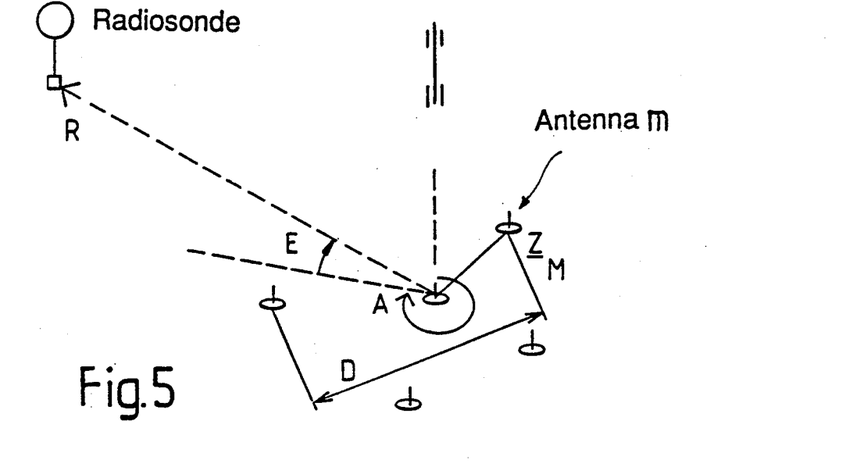
FIG. 5 shows diagrammatically a conventional interferometer.

The computation of the elevation angle with the help of the apparatus illustrated in FIG. 5 takes place as follows:

Initially, the object is assumed to be situated far enough to make the wave front originating from the object to be planar when reaching the antennas, whereby the minimum distance R can be written $$R > D^2/L = 22.5 \text{ m} \quad (1)$$

when the exemplifying case uses an antenna aperture $D = 2$ m and signal wavelength $L = 0.178$ m. In practice R is in the order of several kilometers, thus fulfilling condition (1) invariably.

Referencing to the antenna assigned as the reference antenna, the phase $\phi_m$ measured by each of the elements m can be written $$k(A,E)^*(z_m/L) = 100_m/2\pi + N_m \quad (2a)$$

where k is a unit vector pointed towards the sonde, $Z_m$ is the location of the antenna from the reference antenna, and $N_m$ is an integer. The unit vector k can be written with the help of azimuth and elevation $$k(A,E) = (\cos E \sin A, \cos E \cos A, \sin E) \quad (2b)$$

The coordinate angles A and E can be solved from equations (2) as soon as the unambiguity constants $N_m$ are known, but the solution necessitates the use of numerical methods.

The generalized solution (2) can be streamlined if a few simplifying assumptions are made for the antenna array. First, a reasonable assumption is that the antenna structure is capable of being pointed at the sonde and it has in the elevation plane such real or computationally created antennas in which the phase of the received signal is essentially independent of the azimuth angle. This assumption allows the angle of elevation be solved without knowing the azimuth.

Figure 6A:
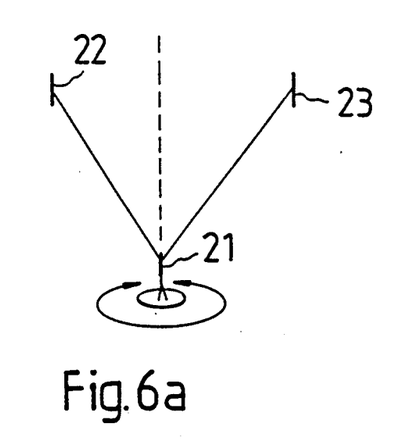
FIG. 6a shows in a diagrammatic front view of an antenna array in accordance with the present invention having a symmetrical construction in respect to the azimuth.
Figure 6B:
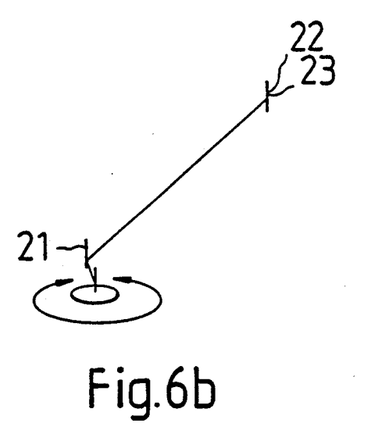

A further assumption can be made that the antenna structure is symmetrical in respect to azimuth, thus allowing for a simple presentation of the effect of elevation on azimuth. The antenna array can be implemented, for instance, as shown in FIGS. 6a and 6b.

Figure 7:
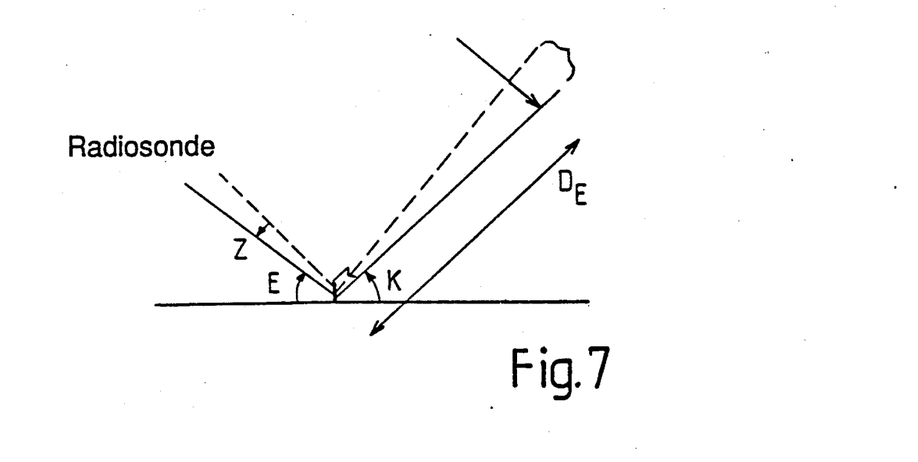
FIG. 7 shows the antenna array illustrated in FIG. 6b complemented with mathematical designations.

According to FIG. 7, the mutual phase difference between the antenna 21 and the mean signal value of antennas 22 and 23 can be solved $$\phi_E = (\sin Z \, D_E/L)2\pi - N^*2\pi \quad (3)$$

where the angle of zenith $Z = 90° - E - K$ and N is an integer yet unsolved. Solving the equation (3) for E gives $$E = \arccos(L/D_E(\phi_E/2\pi + N)) - K \quad (4)$$

In the azimuth direction the antenna structure is pointed at the sonde allowing a first approximation to be obtained from the antenna signal. In reality, the pointing is not accurate, but instead, has a small deviation shown in FIG. 8.

Figure 8:
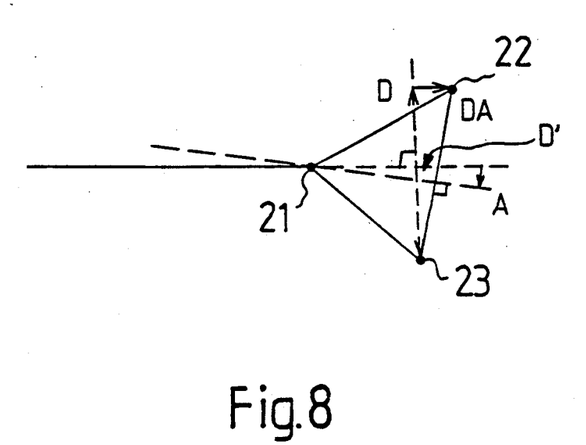
FIG. 8 shows the sensor illustrated in FIGS. 6a and 6b in a top view complemented with mathematical designations.

The phase difference caused by the deviation can be written $$\phi_A = \phi_2 - \phi_3 + 2\pi(N_2 - N_3) \quad (5)$$

If the magnitude of the deviation can be assumed to be small, it is allowed to assign $N_2 = N_3$, whereby the deviation A of azimuth can be written $$\sin A = \phi_A / 2\pi L / D \tag{6}$$

where D is the distance of the antennas 22 and 23 in the azimuth plane. Using the symmetry assumption of the antenna in the azimuth plane, the distance D can be expressed $$D = D_A \cos E \cos Z \tag{7}$$

By assuming a small value for A, the equations (6 and 7) can be simplified by approximation $$\cos A = 1/(1 + A^2/2) \text{ and } \sin A = A \tag{8}$$

allowing A to be computed in two stages $$A_1 = \phi_A / 2\pi L / D_A \cos Z \tag{9}$$

$$A_2 = A_1(1 + A_1^2/2) \tag{9}$$

If the value of A is desired to be solved to a resolution of $\pm 0.01° = \pm 0.000175$ rad, the approximation $A = A_1$ is allowed with the assumption that $$= A_1^3/2 = < 0.000175 \rightarrow = A_1 = < 4° \tag{10}$$

The above derivation of the solved equation (4) for the elevation angle was based on the assumption that the pointing in the azimuth direction was accurate, or $A = 0$. The error caused in a nonideal case thereof into the value of elevation angle can be computed in two stages.

The value of antenna base D used in the calculation of elevation is, however, different from the correct value if the value of azimuth angle is different from zero. The actual projected length of antenna base is $$D' = D_E \cos A \tag{11}$$

Figure 9:
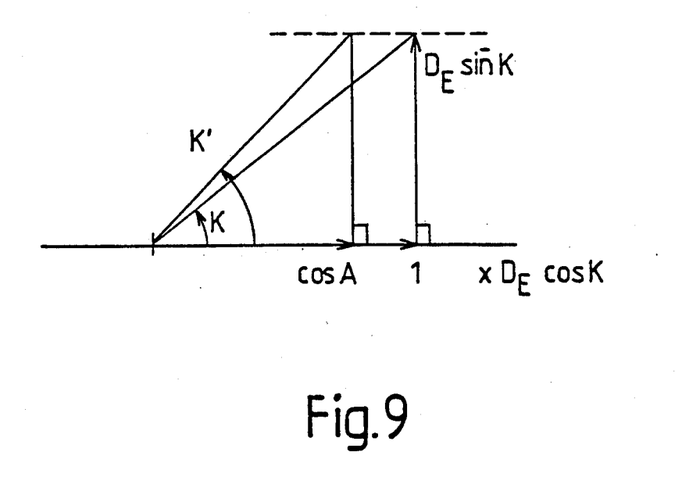
FIG. 9 shows a mathematical model of the inclination of the antenna array.

Correspondingly, the inclination angle K of the antenna array is projected in accordance with FIG. 9.

The inclination angle error can be written $$\tan(K') = \tan K / \cos A \tag{12}$$

At small values of the angle A, the inclination angle deviation can be approximated $$K' - K = A^2/4 \tag{13}$$

Finally, the corrected equation of the elevation angle is obtained $$E = \arccos(L/D_E \cos A(\phi_E/2\pi + N) - K - A^2/4 \tag{14}$$

This correction affects the value of azimuth angle (9), but the correction is minor, so the iterative approximation of equations (9) and (14) converges rapidly.

Figure 10:
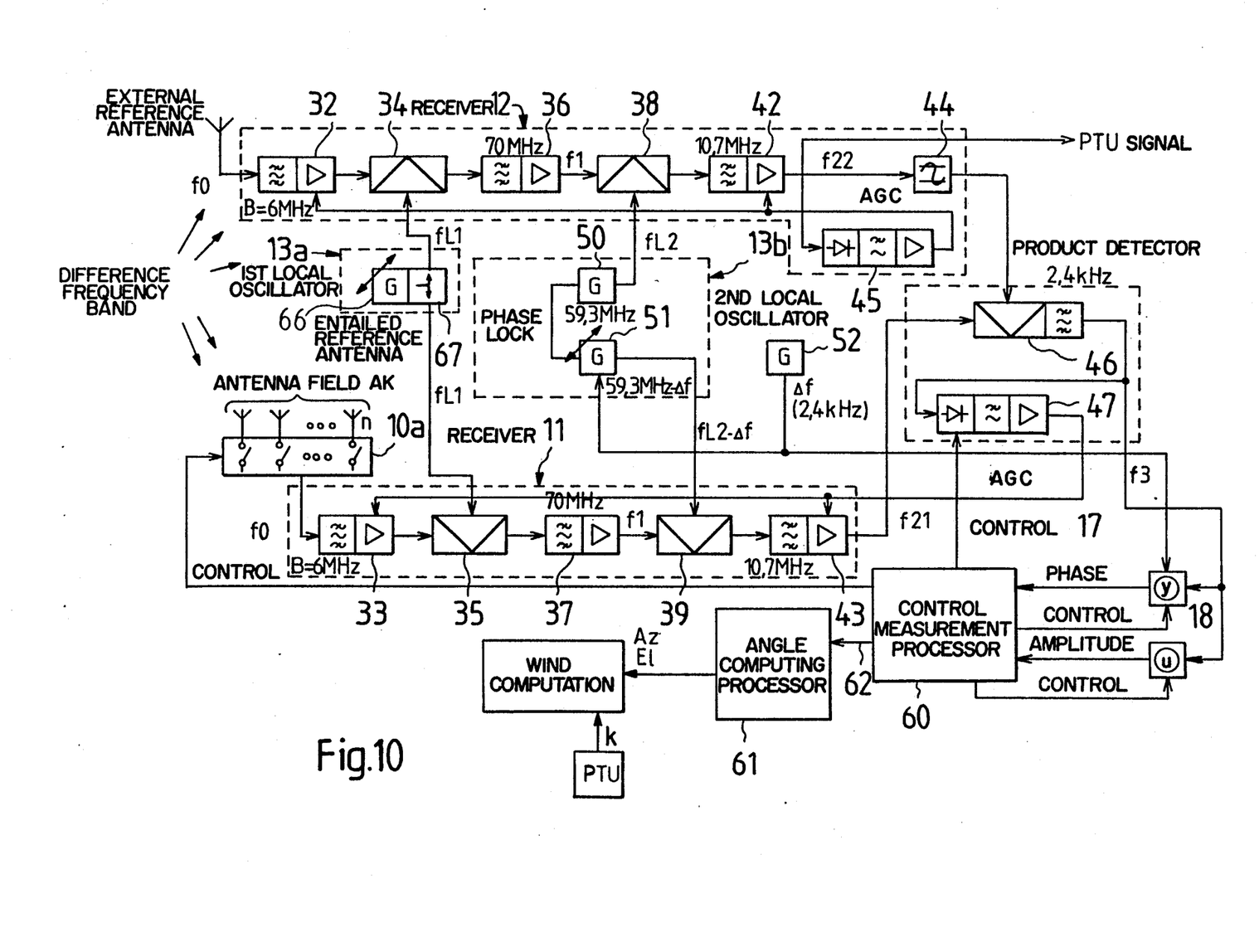
FIG. 10 shows in a detailed block diagram the direction finder illustrated in FIG. 4.

Illustrated in FIG. 10 is the construction of the receiver and measurement system in a block diagram. The system is designed for 1680 MHz radiosondes, necessitating the coverage of the frequency band 1660 ... 1700 MHz. The equipment comprises two almost identical dual-superheterodyne receivers, designated receivers 11 and 12 (cfr. FIG. 4). The input signal to the receiver 12 is taken from an external reference antenna 10 of the antenna array, while the input signal to the receiver 11 is alternatingly taken from all antennas of the antenna array AK under the control of a signal-selecting antenna switch 10a.

Front stages 32 and 33 of the receivers 11 and 12 are comprised of a 1680 MHz bandpass filter, whose bandwidth covers the entire frequency band 1660 ... 1700 MHz, and an amplifier stage. The amplified and filtered RF signal is mixed in a diode mixer 34 and 35 with a 1590 ... 1630 MHz signal of a first local oscillator 66 to obtain a first intermediate frequency of 70 MHz. Both receivers 11 and 12 use a common local oscillator 13a, whose signal routed via a branching unit 67. The first intermediate-frequency signal is filtered and amplified in a first IF stage 36 and 37, and then taken to a second mixer 38 and 39. The receiver 11 receives its second local oscillator signal from crystal oscillator 50 delivering a fixed 59.3 MHz signal. The second local oscillator signal of the receiver 11 is obtained from a voltage-controlled crystal oscillator 51, which is phase-locked to the signal of the other oscillator 50 so that its output frequency is lower exactly by a frequency of $\Delta f = 2.4$ kHz determined by a separate reference oscillator 52. The 10.7 MHz intermediate-frequency signal obtained from the second mixer 38, 39 is filtered and amplified in a second IF stage 42 and 43.

The second IF signal of the receiver 12 also carries transmitter information of the sonde 31 about ambient pressure, humidity and temperature, conventionally called the PTU signal, which is taken to a dedicated detector for further processing. The second IF signal of the receiver 11 is taken to one input of a product detector 46, whose other input receives the second IF signal of the receiver 12 clipped to a constant level by a limiter 44. The product detector 46 delivers the difference frequency $f_3$, of the second IF signals of the receivers filtered through a bandpass filter.

The frequency designations used in FIG. 10 are:
$f_0$ = input signal frequency
$f_1$ = first intermediate frequency
$f_{21}$ = second intermediate frequency of receiver 11
$f_{22}$ = second intermediate frequency of receiver 12
$f_3$ = frequency of detected signal
$f_{L1}$ = first local oscillator frequency
$f_{L2}$ = second local oscillator frequency
$\Delta f$ = reference frequency Using the frequency designations given above the frequencies for FIG. 4 are written: $f_3 f_{21} - f_{22}$, while on the other hand $f_{22} = F_0 - f_{L1} - F_{L2}$ and $f_{21} = f_0 - f_{L1} - (f_{L2} - \Delta f)$. When the latter expressions are inserted in the former, the result is $f_3 = \Delta f$. Consequently, the difference frequency is equal to the reference frequency $\Delta f$ irrespective of the input signal frequency $f_0$ and the frequencies of the local oscillator signals $f_{L1}$ and $f_{L2}$. The difference frequency, however, contains the same amplitude information as the input signal to the receiver 11 and its phase difference from the reference frequency signal $\Delta f$ is linearly proportional to the phase difference between the signals of the external reference antenna and any signal selected at a time by the antenna switch 10a from the signals of antennas 1 ... n. This approach makes the measurement result insensitive to the drift of the local oscillator frequencies $f_{L1}$ and $f_{L2}$.

The automatic gain control (AGC) of the receiver 12 is implemented so that the second IF signal is sampled by an AGC detector 45, whose output voltage controls the gain of the input stage 32 and the second IF stage 42, thus controlling the IF signal amplitude to a constant level. The receiver 11 differs from the above description for the part an AGC detector 47, which senses the amplitude of detected signal. Further, the AGC detector 47 is gated by a control signal so that the AGC sample is taken only when the antenna switch 10a is controlled to the entailed reference antenna n, after which the AGC voltage is clamped to a constant level when the other antennas are being selected. This approach prevents the amplitudes of signal from the other antennas from affecting the AGC voltage.

A control and measurement processor 60 takes care of the timing of functions and delivers sampling control signals to phase and amplitude measuring circuits 17 and 18 so that these circuits can perform the measurement of the detected signal. The phase difference is measured against the 2.4 kHz reference signal using a digital circuit, and the amplitude measurement takes place with the help of a fast peak-value rectifier.

The antenna selector switch 10a is controlled so that the antennas 1 . . . n of the actual antenna array are sequentially selected, and between the measurements of each two subsequent antennas, the signal of the internal reference antenna is measured in order to obtain a sample from the signal of the reference antenna n as soon as possible after each measurement of the other antennas 1 . . . n−1. Such an approach minimizes the phase error arising from the drift of propagation time and other like factors. Consequently, the measurement sequence proceeds in the order: 1,n, 2,n, 3,n . . . , and the measurements are cycled several times in sequence. The measurement sequence is repeated at, for instance, intervals of one second, and the result is obtained as an average of several measurement cycles. The measurement of a single antenna takes place within approx. 2.5 ms.

The control and measuring processor 60 converts the measurement results of phase and amplitude into digital form and feeds the data through a serial bus 62 to an angle-computing processor 61, which computes the azimuth and elevation from the data.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

What is claimed is:

1. An apparatus for measuring azimuth and elevation of an object, comprising:
   a platform;
   a base plate connected to said platform and is rotatable in a substantially horizontal plane;
   a sensor frame connected to said base plate such that sensor frame rotates in said substantially horizontal plane;
   at least three sensor elements connected to said sensor frame;
   control means for controlling said sensor elements and for processing signals received from said sensor elements; and
   pointing means, operatively connected to said control means and said base plate, for pointing said sensor elements in an azimuth direction having a highest field strength;
   said sensor frame being rigidly attached to said base plate and being backward inclined at a range of 40 to 50 degrees;
   said sensor elements having a directional pattern such that an entire angle span of interest is covered in an elevational plane, while said directional pattern covers an essentially narrower angle in an azimuth plane.

2. The apparatus as claimed in claim 1, wherein said sensor frame is backward inclined at 45°.

3. The apparatus as claimed in claim 2, wherein said sensor elements are catergorized by beam patterns into two different types.

4. The apparatus as claimed in claim 2, wherein said sensor frame is V-shaped and has a symmetrical construction with respect to an azimuth coordinate;
   said sensor elements with a narrowest beam pattern being attached to a top part of said sensor frame, while said sensor elements with a broadest beam pattern being attached to a lower part of said sensor frame so that said sensor elements with said narrowest beam pattern are aligned to point closer to a horizon than said sensor elements with said broadest beam pattern.

5. A method for measuring azimuth and elevation of an object using a direction finder having at least three sensor elements, comprising the steps of:
   (a) rotating the sensor elements in an azimuth plane;
   (b) measuring a field strength of an incoming signal with the sensors elements;
   (c) pointing the sensors elements at a direction of a maximum field strength to obtain a coarse value for the azimuth of the object;
   (d) determining an exact value of an azimuth angle by a phase difference measurement;
   (e) using at least two sensor element of different beam patterns to make an elevation coordinate measurement;
   (f) measuring a ratio of the field strength of incoming signals;
   (g) processing the ratio measured in said step (f) to determine a coarse value of an elevation angle;
   (h) measuring a phase difference of signals received by the sensor elements in a vertical plane; and ;
   (i) processing the measured phase difference of said step (h) to determine the elevation with a higher resolution.

6. The method as claimed in claim 5, further comprising the steps of:
   (j) providing sensor elements with a narrow beam pattern at a top part of a sensor frame which supports the sensor elements; and
   (k) providing sensor elements with a broad beam pattern at a lower part of the sensor frame so that the sensor elements with the narrow beam pattern are aligned to point closer to a horizon than the sensor elements with the broad beam pattern.

* * * * *